United States Patent Office 3,179,585
Patented Apr. 20, 1965

3,179,585
METHOD OF PREPARING AN ACTIVE SILICEOUS CRACKING CATALYST
Chester N. White, Moylan, Pa., assignor to Sun Oil Company, Philadelphia, Pa., a corporation of New Jersey
No Drawing. Filed May 13, 1963, Ser. No. 280,078
13 Claims. (Cl. 208—120)

This invention relates to improved siliceous catalysts for use in cracking hydrocarbons. The individual particles of the improved catalysts of the invention have a reddish-purple color when viewed under ultraviolet (3200–4000 A.) light and can be separated from conventional siliceous cracking catalysts, the latter containing both reddish-purple particles and cream particles when viewed under ultraviolet light.

Catalytic cracking of hydrocarbons is an old and well known technique in the petroleum industry, its purpose being to convert relatively high boiling hydrocarbons to lower boiling, more valuable products. Although most frequently employed to convert light gas oil fractions (boiling mainly in the range of 550°–700° F.) to products boiling in the gasoline boiling range (90°–410° F.), catalytic cracking is also utilized to convert relatively high boiling fractions (750°–1200° F.) to lower boiling products. The conditions employed in conventional catalytic cracking include a temperature in the range of 800°–1100° F., a pressure in the range of 0 to 100 p.s.i.g., and a space velocity in the range of 0.5 to 5.0 volumes of hydrocarbon per hour per volume of catalyst.

It is also well known that conventional catalytic cracking of hydrocarbons also results in the formation of some by-products, the two most common being carbon (i.e., coke) and gas. Coke results from complete decomposition of some of the hydrocarbon and accumulates on the surface of the catalyst particles. Periodically, the coke must be burned off the catalyst surface in order to maintain the activity of the catalyst at an acceptable level. Gas is propane, butane, ethylene, and other normally gaseous hydrocarbons and results from excessive cracking short of complete decomposition of some of the hydrocarbon feed. While some of the gas can sometimes be economically disposed of as, for example, liquefied petroleum gas or in the manufacture of polyolefins, it is often merely burned to the atmosphere.

The catalysts employed in conventional catalytic cracking processes contain silicon dioxide and an oxide of some other metal which is usually aluminum, although oxides of other metals such as zirconium and magnesium are sometimes used in place of aluminum oxide. In some cases the catalyst also contains a relatively small amount of a third metal oxide such as chromium oxide, manganese dioxide, etc. in order to improve the efficiency of the catalyst in certain respects. However, all cracking catalysts presently in commercial use are siliceous, i.e., they contain silicon dioxide. Most of these also contain aluminum oxide, and these are conventionally referred to as silica-alumina catalysts.

It has now been found that conventional siliceous cracking catalysts contain, when viewed under ultraviolet light, a mixture of reddish-purple particles and cream particles and further, that cracking results obtained using substantially only the reddish-purple particles as catalyst are superior to those obtained when either substantially only cream colored particles are used or when the mixture of reddish-purple particles and cream particles are used. The cracking results are superior in that when, for example, cracking a light gas oil to gasoline, less coke and gas are formed while the amount of gasoline produced is essentially the same. In other words, an improved product distribution is obtained when using only the reddish-purple particles as catalyst. Stated in another manner, the reddish-purple particles are more active for making gasoline and the cream-colored particles are less active for making gasoline. This difference in color of the particles and the difference in cracking results exists with conventional siliceous cracking catalysts whether the additional metal oxide is aluminum oxide, magnesium oxide or any other conventional metal oxide.

The aforesaid difference in color of the catalyst particles under ultraviolet light is a marked difference. When viewed in daylight, the catalyst particles appear uniformly white or a very light gray. The reddish-purple color observed under ultraviolet light is not a light reddish-purple but rather is fairly deep. Both the reddish-purple and cream colors observed have a brilliance which is not present in the white or very light gray color observed in daylight. When the catalyst particles are examined under ultraviolet light, the reddish-purple and cream colors can be readily distinguished without difficulty. It has also been found that the cream colored particles usually phosphoresce for 5–10 seconds after the ultraviolet light is removed. This observation, however, is not necessary in order to rapidly distinguish the cream particles from the reddish-purple particles. Appearance in the presence of ultraviolet light alone is adequate. In addition, the surface appearance of the particles under ultraviolet light extends into the body of the particle. Thus reddish-purple particles remain reddish-purple even after being ground.

The reason for the difference in color of the particles, i.e., the reason for the improved cracking results obtained by using the reddish-purple particles, is not known. Chemical analysis of both reddish-purple particles and cream particles of a number of conventional siliceous cracking catalysts discloses no difference in composition relatable to the difference in cracking results. Emission spectrographic analyses of the two different colored particles were not precisely the same but the difference in the analyses could not be correlated with the difference in cracking results. Likewise, X-ray diffraction studies disclosed no explanation for the difference in cracking results obtained with the different colored particles. Other tests were also negative. Thus there was no significant difference in the acidity distribution of the cream and reddish-purple particles. In addition, heating the particles in an atmosphere of hydrogen at 1000° F. for 2–3 hours effected no change in the appearance of the particles under ultraviolet light.

Regardless of a lack of explanation therefor, the difference in cracking results obtained when using the different colored particles as catalyst does exist. The difference exists with both natural, synthetic, and semi-synthetic siliceous cracking catalysts. Natural siliceous cracking catalysts are conventionally prepared by a procedure which involves mildly treating a naturally occurring clay such as kaolin, bentonite, halloysite, montmorillonite, etc. with sulfuric acid followed by washing with water. These clays all contain mainly $SiO_2$ and $Al_2O_3$ although the molar ratio of $Al_2O_3$ to $SiO_2$ will vary from one clay to another. The purpose of the acid treatment is to convert oxides of other metals also present in the clay such as iron, alkali metals, and alkaline earth metals to a water soluble form. The acid treatment is mild in order to avoid converting a substantial amount of the aluminum oxide to aluminum sulfate and subsequent removal of the latter in the water washing step. After the various metal sulfates are leached from the clay by the water washing, the clay is then roasted at, say, 1000° F. in order to convert all silicon and aluminum to the oxide form. The catalyst is then pelleted or ground depending upon whether it is to be used in a fixed or moving bed cracking unit or a fluidized bed cracking unit. For fixed or moving bed operations, catalyst pellets about 4 mm. long are employed while for fluidized operation, the catalyst particles are of such size that 90% of same are smaller than 150 microns. The activity of a natural catalyst prepared as described can be modified by various techniques such as steam aging, hydration, etc. well known to those skilled in the art. By way of example, steam aging is a means employed to raise catalyst activity and involves heating the catalyst at, say, 1300° F. in an atmosphere which is partially or entirely steam for a period of, say, 1–2 hours.

Since natural siliceous catalysts are superior to synthetic catalysts in a number of respects such as pore shrinkage, thermal deactivation, etc., they are preferred for the present purpose.

Synthetic catalysts are prepared by a variety of well known techniques. One principal procedure involves cogelation of silica and alumina from mixed aqueous solutions of sodium silicate and aluminum sulfate followed by water washing and spray drying. Another procedure involves formation of a silica hydrogel by reacting sodium silicate with sulfuric acid followed by impregnation of the gel with aluminum sulfate, ammonia neutralization, washing, and spray drying. Silica-magnesia, silica-zirconia, etc. catalysts are prepared by analogous techniques. Additional metals such as chromium, manganese, etc. can be incorporated into both synthetic and natural siliceous cracking catalysts by well known procedures.

Semi-synthetic siliceous cracking catalysts contain both natural and synthetic catalysts and represent an attempt to take advantage of the more desirable properties of each. They also can be prepared by procedures well known in the art.

The silica ($SiO_2$) content of most siliceous cracking catalysts is in the range of 50–95%. In the case of a silica-alumina cracking catalyst the alumina ($Al_2O_3$) content will usually be in the range of 5–50%. For example, a commercial cracking catalyst manufactured by the Houdry Process Corp. contains approximately 12% $Al_2O_3$ and 88% $SiO_2$. A commercial cracking catalyst manufactured by the Filtrol Corporation contains 45% $Al_2O_3$ and 55% $SiO_2$. Another commercial catalyst contains 11% $Al_2O_3$, 0.1% $Cr_2O_3$, the balance being $SiO_2$.

Since most commercial cracking catalysts are silica-alumina catalysts, the latter are preferred for the present purpose.

It has also been found, by examination of a number of different catalysts, that regenerated siliceous cracking catalysts also contain reddish-purple and cream colored particles and that the reddish-purple particles give improved cracking results. The only significant difference in the color of regenerated catalyst particles is the color of the particles when viewed in ordinary daylight. The particles are slightly grayer than the corresponding fresh, i.e., unused catalyst particles.

The relative number of reddish-purple colored particles in conventional siliceous cracking catalysts varies from about 5% ot 80%. As with the presence of the different colored particles, the reason for this variation in the number of reddish-purple particles is unknown. It has not been possible to relate the number of such particles to such factors as the type of catalyst, i.e., natural, synthetic, etc.; the silica content or acidity distribution of the catalysts, and the like. Regardless of the number of reddish-purple particles present, however, such particles do give improved cracking results.

The improved cracking results obtained by using substantially only the reddish-purple particles as catalyst were determined by experiments utilizing two catalyst evaluation tests well known in the petroleum industry and described as follows:

One test, developed in the early years of commercial catalytic cracking is known as the Cat A Cracking Test and is described in National Petroleum News, August 2, 1944, pp. R537–8. The other test is known in the industry as the Cat S Cracking Test. This test is a modified Cat A Cracking Test, the modifications being made so that the test procedure would conform more closely to commercial catalytic cracking units as they finally developed over the years.

Although the results from a Cat S Test are generally considered to be a closer approximation to actual plant results than Cat A Test results, either test can fairly be used to compare two or more different catalysts. For example, the difference in gasoline yield utilizing two different catalysts will be substantially the same whether the Cat A or Cat S Test is used.

The data in Table I show the results obtained when a commercial silica-alumina cracking catalyst was examined under ultraviolet light, separated by hand into a group of particles having a cream color and a group of particles having a reddish-purple color, and two Cat A Tests and two Cat S Tests performed on each type of particle. The commercial catalyst employed is known commercially as "Filtrol" 63 and was prepared by treating Halloysite clay with sulfuric acid, washing the acid treated clay, roasting the washed clay to convert sulfates to oxides, and pelleting. The catalyst composition was 57% $SiO_2$–43% $Al_2O_3$. When viewed under ultraviolet light approximately 50% of the catalyst particles were cream and approximately 50% were reddish-purple. Each stated analysis for gasoline, coke, gas, gas gravity, and conversion is the average of two separate tests.

*Table I*

| Cracking Product | Cat. A Cracking Test | | | Cat. S Cracking Test | | | Average Difference $\frac{(X+Y)}{2}$ |
|---|---|---|---|---|---|---|---|
| | Cream Particles | Reddish Purple Particles | Difference (X) | Cream Particles | Reddish Purple Particles | Difference (Y) | |
| Gasoline—Vol. percent of feed | 34.8 | 33.1 | 1.7 | 30.7 | 30.7 | | 0.8 |
| Coke—Wt. percent of feed | 3.9 | 3.5 | 0.4 | 8.9 | 8.1 | 0.8 | 0.6 |
| Gas—Wt. percent of feed | 10.4 | 9.7 | 0.7 | 21.5 | 20.7 | 0.8 | 0.8 |
| Gas Sp. Grav.—at 60° F. and 1 atmosphere and referred to air at same conditions | 1.42 | 1.44 | | 1.24 | 1.20 | | |
| Conversion—Wt. percent of feed | 48.0 | 45.5 | 2.5 | 58.6 | 56.5 | 2.1 | 2.3 |

The yield data show that improved gasoline yield is obtained when using the cream colored particles and that improved coke and gas yields are obtained when using the reddish-purple particles as catalyst. However, the improvement in gasoline yield found is not significant; consequently, with respect to gasoline yield, the only conclusion that can be drawn is that there is no significant difference in either catalyst. On the other hand, the improvement in coke and gas production obtained with the reddish-purple particles is significant. Moreover, it is readily apparent that the reddish-purple particles effect a reduction in coke of approximately 10% and a reduction in gas of approximately 5%. In other words, the reddish-purple particles are more active for making gasoline and the cream-colored particles are less active for making gasoline. In large volume processes like gasoline processes such reductions result in very substantial reductions in costs.

When other conventional siliceous cracking catalysts are observed under ultraviolet light and the reddish-purple particles separated therefrom and utilized in catalytic cracking, similar improvements are also obtained.

The invention claimed is:

1. Method of catalytically cracking a hydrocarbon cracking stock utilizing a catalyst of improved activity for making gasoline which comprises subjecting a batch of siliceous cracking catalyst all portions of which have been manufactured in the same manner to ultraviolet light, whereby under the influence of such light catalyst particles more active for producing gasoline appear reddish-purple and catalyst particles less active for producing gasoline appear cream-colored, separating the more active reddish-purple particles from the less active cream-colored particles, and contacting a hydrocarbon cracking stock with said more active reddish-purple particles under cracking conditions.

2. Method according to claim 1 wherein said cracking conditions include a temperature in the range of 800° to 1100° F., a pressure in the range of 0 to 100 p.s.i.g., and a space velocity in the range of 0.5 to 5.0 volumes of hydrocarbon per hour per volume of catalyst.

3. Method according to claim 1 wherein said siliceous cracking catalyst is a silica-alumina cracking catalyst.

4. Method according to claim 3 wherein said silica-alumina cracking catalyst has been prepared by treating a naturally-occurring clay containing oxides of silicon and aluminum with sulfuric acid, washing the acid treated clay, and roasting the washed clay to convert sulfates to oxides.

5. Method of catalytically cracking a hydrocarbon cracking stock utilizing a catalyst of improved activity for making gasoline which comprises contacting said hydrocarbon cracking stock under cracking conditions with a siliceous cracking catalyst substantially all the particles of which have a reddish-purple color when viewed under ultraviolet light, said catalyst having been obtained by subjecting a batch of siliceous cracking catalyst all portions of which have been manufactured in the same manner to ultraviolet light, whereby under the influence of such light catalyst particles more active for producing gasoline appear reddish-purple and catalyst particles less active for producing gasoline appear cream-colored, and separating the more active reddish-purple particles from the less active cream-colored particles.

6. Method according to claim 5 wherein said cracking conditions include a temperature in the range of 800° to 1100° F., a pressure in the range of 0 to 100 p.s.i.g., and a space velocity in the range of 0.5 to 5.0 volumes of hydrocarbon per hour per volume of catalyst.

7. Method according to claim 5 wherein said siliceous cracking catalyst is a silica-alumina cracking catalyst.

8. Method according to claim 7 wherein said silica-alumina cracking catalyst has been prepared by treating a naturally-occurring clay containing oxides of silicon and aluminum with sulfuric acid, washing the acid treated clay, and roasting the washed clay to convert sulfates to oxides.

9. In a process for catalytically cracking a hydrocarbon cracking stock boiling mainly in the range of 550°–700° F. to form products boiling below 410° F. by means of a silica-alumina cracking catalyst all the particles of which have been manufactured in the same manner, the step of improving the activity of said catalyst for producing gasoline which comprises subjecting said catalyst to ultraviolet light, whereby under the influence of such light catalyst particles more active for producing gasoline appear reddish-purple and catalyst particles less active for producing gasoline appear cream-colored, separating the more active reddish-purple particles from the less active cream-colored particles, and contacting said hydrocarbon cracking stock with said more active reddish-purple particles under cracking conditions.

10. Method according to claim 9 wherein said cracking conditions include a temperature in the range of 800° to 1100° F., a pressure in the range of 0 to 100 p.s.i.g., and a space velocity in the range of 0.5 to 5.0 volumes of hydrocarbon per hour per volume of catalyst.

11. Method according to claim 9 wherein said siliceous cracking catalyst is a silica-alumina cracking catalyst.

12. Method according to claim 11 wherein said silica-alumina cracking catalyst has been prepared by treating a naturally occurring clay containing oxides of silicon and aluminum with sulfuric acid, washing the acid treated clay, and roasting the washed clay to convert sulfates to oxides.

13. Method of improving the gasoline producing activity of a siliceous cracking catalyst all portions of which have been manufactured in the same manner which comprises subjected said siliceous cracking catalyst to ultraviolet light, whereby under the influence of such light catalyst particles more active for producing gasoline appear reddish-purple and catalyst particles less active for producing gasoline appear cream-colored, and separating the more active reddish-purple particles from the less active cream-colored particles.

References Cited by the Examiner
UNITED STATES PATENTS

| | | | |
|---|---|---|---|
| 2,307,795 | 1/43 | Kearhy | 208—120 |
| 3,072,563 | 1/63 | Hickson | 208—120 |

ALPHONSO D. SULLIVAN, *Primary Examiner.*

DANIEL E. WYMAN, A. RIMENS, *Examiners.*